United States Patent
Kennedy et al.

(10) Patent No.: US 8,261,131 B2
(45) Date of Patent: Sep. 4, 2012

(54) RECOVERY FROM HDD FAILURE AND TECHNICAL SUPPORT THROUGH WWAN

(75) Inventors: Sean Patrick Kennedy, San Diego, CA (US); Fredrik Carpio, Menifee, CA (US); Adrian Crisan, San Diego, CA (US); Rommel Garay, San Marcos, CA (US); Gary Robert Lyons, San Diego, CA (US); Edward Theodore Winter, San Diego, CA (US)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 12/905,915

(22) Filed: Oct. 15, 2010

(65) Prior Publication Data

US 2012/0096313 A1    Apr. 19, 2012

(51) Int. Cl.
*G06F 11/00* (2006.01)
(52) U.S. Cl. .................. 714/46; 714/36; 713/2
(58) Field of Classification Search ............ 714/36, 714/46; 713/2
See application file for complete search history.

(56) References Cited

U.S. PATENT DOCUMENTS

| | | | | |
|---|---|---|---|---|
| 5,367,667 A | * | 11/1994 | Wahlquist et al. | 714/32 |
| 5,956,475 A | * | 9/1999 | Burckhartt et al. | 714/23 |
| 5,978,912 A | * | 11/1999 | Rakavy et al. | 713/2 |
| 6,035,420 A | * | 3/2000 | Liu et al. | 714/25 |
| 6,101,617 A | * | 8/2000 | Burckhartt et al. | 714/23 |
| 6,189,114 B1 | * | 2/2001 | Orr | 714/25 |
| 6,272,629 B1 | * | 8/2001 | Stewart | 713/2 |
| 6,477,482 B1 | * | 11/2002 | Maupin et al. | 702/183 |
| 6,539,499 B1 | * | 3/2003 | Stedman et al. | 714/40 |
| 6,807,643 B2 | * | 10/2004 | Eckardt et al. | 714/36 |
| 7,310,747 B2 | * | 12/2007 | Lauterbach et al. | 714/36 |
| 2003/0014297 A1 | | 1/2003 | Kaufman et al. | |
| 2003/0163765 A1 | * | 8/2003 | Eckardt et al. | 714/36 |
| 2007/0192654 A1 | * | 8/2007 | Lauterbach et al. | 714/36 |
| 2008/0192923 A1 | | 8/2008 | Ruckart | |
| 2008/0195897 A1 | | 8/2008 | Alaniz et al. | |
| 2010/0199129 A1 | * | 8/2010 | Kitani | 714/25 |
| 2011/0029816 A1 | * | 2/2011 | Perng et al. | 714/36 |
| 2011/0314267 A1 | * | 12/2011 | Watanabe et al. | 713/2 |

FOREIGN PATENT DOCUMENTS

WO    2008154726    12/2008

* cited by examiner

*Primary Examiner* — Charles Ehne
(74) *Attorney, Agent, or Firm* — John L. Rogitz

(57) ABSTRACT

A user of a user computer whose hard disk drive (HDD) is "fried" can press a special key to cause BIOS to automatically gather location information about the computer from its GPS receiver and gather information about the HDD, activate a WWAN transceiver, and automatically send the location and HDD information over the WWAN to a service computer, which may return a location of a nearest service center to the user computer and any other advice including recovery advice for the HDD that the service center might be able to divine from the information sent to it by the user computer.

20 Claims, 2 Drawing Sheets

RECOVERY FROM HDD FAILURE AND TECHNICAL SUPPORT THROUGH WWAN

FIELD OF THE INVENTION

The present invention relates generally to recovery from hard disk drive (HDD) failure and technical support through a wireless wide areas network (WWAN).

BACKGROUND OF THE INVENTION

When a user starts up a personal computer (PC), an initial, small operating system, stored in the local solid state memory of the PC, known as the basic input output system (BIOS), first starts up. Among other tasks, BIOS copies files of the main operating system (O.S.) from the hard disk drive (HDD) of the PC, where the files permanently reside, into memory of the PC, which accessed during operation for fast access and then flushed of the main O.S. files upon shut down. HDDs also often include a recovery partition which may be used to restore the HDD if errors or other abnormalities arise.

As understood herein, however, the HDD may become completely inaccessible or otherwise malfunction (colloquially referred to as being "fried") to the point at which the tools and files in the HDD recovery partition to restore the HDD are unavailable. If a PC has experienced such a problem or a user needs help with system recovery, and a computer user customer has no (or limited) internet access, it is problematic for the customer to contact and find the nearest service center or online help server.

SUMMARY OF THE INVENTION

The present application presents a solution to a situation in which a hard disk drive is fried and the user has little clue what to do about it. The user's computer includes a processor that may access a solid state memory for executing a basic input output system (BIOS). The BIOS may launch a main operating system stored in a hard disk drive (HDD) configured to be booted into the memory during a power on operation. The processor additionally communicates with a wireless wide area network (WWAN) transceiver and receives a signal from a special key when manipulated by a user. That signal from the special button causes the processor to automatically execute at least one diagnostic routine to ascertain status of the HDD and to activate the WWAN transceiver to send information to a predetermined address associated with a service computer using the WWAN transceiver. Information sent to the service computer includes at least status of the HDD and one identifier associated with the computer such as a model number.

The user computer includes a global positioning satellite (GPS) receiver that may be activated by BIOS in response to the special button being pressed in order to communicate location information of the computer to the PC. The special button may be hardwired on the outside of the user computer is desired, or may also be in a software form. The location information ascertained by the GPS receiver may be sent to the service computer via WWAN transceiver. At least one bit of user computer identifying information, such as a model number or serial number, is also sent to the service computer. Additional identifying information, such as computer color, may be sent as well. The WWAN transceiver may be activated by BIOS and may send the information to the service computer without being able to boot the main operating system from the HDD into memory.

The special button can be located on the keyboard or other keypad, external housing of the user PC, or may be in the form of a software button. BIOS may be booted before an attempt to power on the user computer and load the main operating system into memory is made. The information receiver from the service computer may include a location of a local service center and additional information deemed helpful to the user.

In another aspect, a method includes, at a user computer, receiving a signal from a special key prior to booting a main operating system (O.S.) from a hard disk drive (HDD) of the user computer into a solid state memory of the user computer. The method includes, responsive to the signal from the special key and without further user interaction, executing at least one diagnostic test on the HDD. Further responsive to the signal from the special key and without further user interaction, a wireless wide area network (WWAN) transceiver that is associated with the user computer is activated. Also, further responsive to the signal from the special key and without further user interaction, the WWAN transceiver is used to automatically send to a service computer at least one result of the diagnostic test and at least one identifier associated with the computer.

In another aspect, a user computer includes a hard disk drive (HDD) and a special key manipulable by a user to cause a basic input output system (BIOS) to automatically gather location information about the user computer from a position receiver and gather information about the HDD. Also, BIOS activates a wireless wide area network (WWAN) transceiver, and automatically sends the location information and information about the HDD over the WWAN to a service computer. The user computer receives back from the service computer a location of a nearest service center to the user computer.

DETAILED DESCRIPTION OF THE PREFERRED EMBODIMENT

Figure 1:
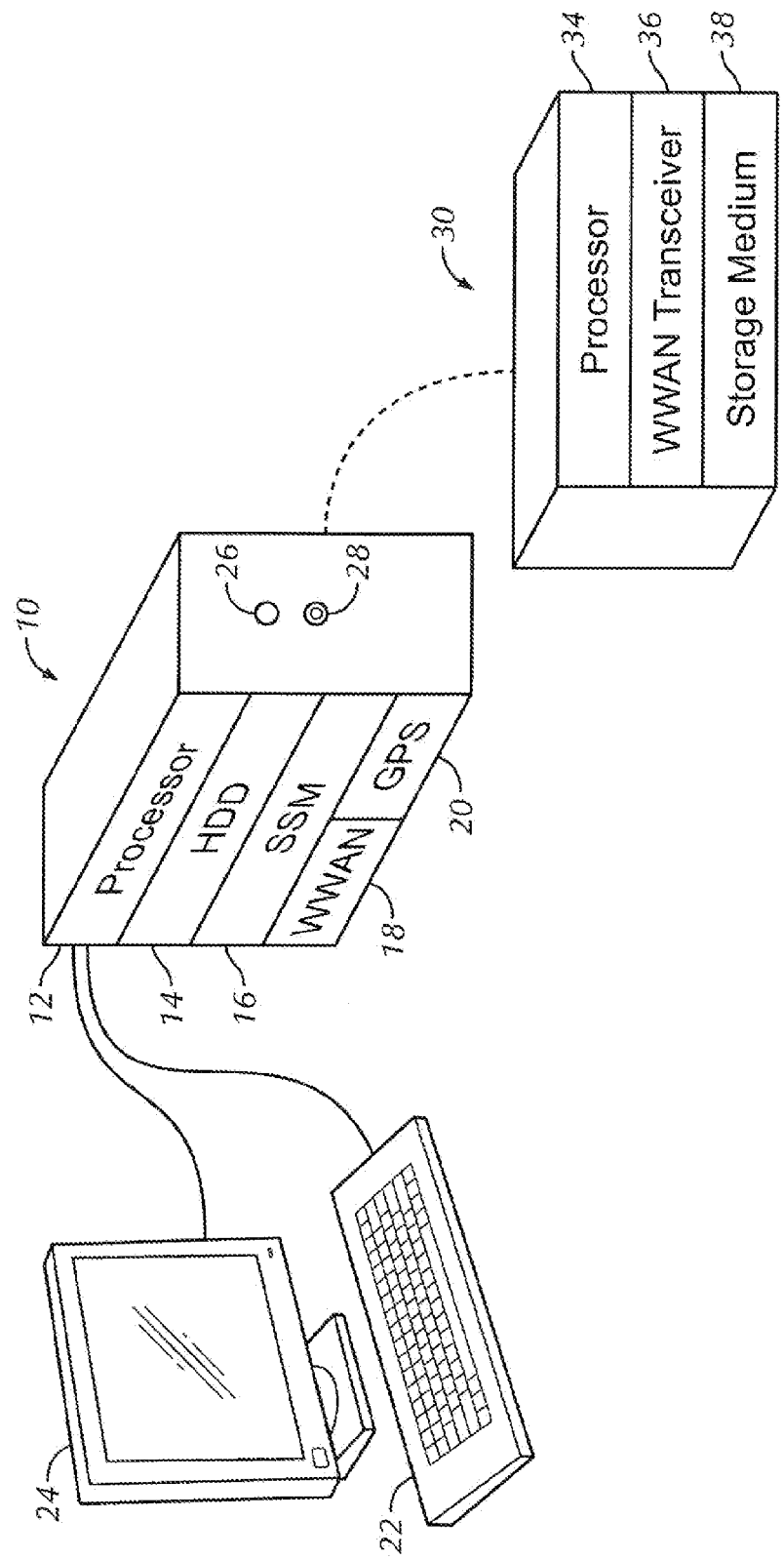
FIG. 1 depicts a personal computer (PC) with its internal parts as well as external components and a customer service server.

Initially referring to FIG. 1, a personal computer (PC), generally labeled 10, is shown to have internal components comprising: a processor 12, a hard disk drive (HDD) 14, a solid state memory (SSM) 16, a wireless wide area network (WWAN) transceiver 18, and a GPS receiver 20. The processor 12 is accessible to the SSM 16 for executing basic input output system (BIOS). The HDD 14 stores a main operation system that is configured to undergo booting into the memory by BIOS during a power on operation. The PC 10 may also receive information from a keyboard 22 and send visual information to a computer display 24.

Two buttons may be built in the external housing of the PC 10: a power button 26 and a special button, or key, 28. The location of the special button 28 may also be found on the keyboard 22, other keypad, or may differ in that it may be a software key presented on the display 24 and selectable by means of, e.g., the keyboard 22 or other input device such as a mouse. In any case, the special button 28 sends a signal to the processor 12 when manipulated by a user, wherein the processor 12 automatically executes at least one diagnostic routine to ascertain status of the HDD 14.

Concurrently, the processor 12 activates BIOS which in turn triggers the GPS receiver 20 to ascertain the location of the PC and communicate that location to the PC 10. The WWAN transceiver 18, also activated by processor 12, sends information to a preprogrammed address associated with a customer service server 30 without the PC 10 being able to boot the main operating system from the HDD 14 into SSM 16. The information sent by the WWAN transceiver 18 in such a case includes location information established by the GPS 20, the model number and the serial number of the PC 10. The customer service server 32 includes one or more processors 34, a WWAN transceiver 36, and a storage medium 38.

Figure 2:
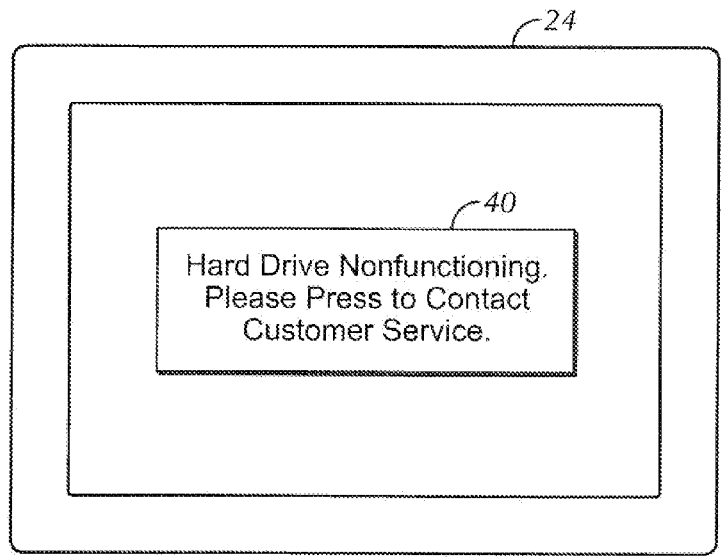
FIG. 2 is a screen shot displayed on the monitor of the PC when the special button is pressed.

FIG. 2 shows a screen shot on the display 24 composed of a special button in its software form 40 that informs the user that the HDD 14 is no longer functioning. This screen shot may be displayed after the power button 26 is pressed and the main operating system cannot be booted to the SSM 16. The user may click the special button 40 to activate BIOS and set into motion the events described above including diagnostics of HDD 14 and activation of WWAN transceiver 18 and GPS 20.

Figure 3:
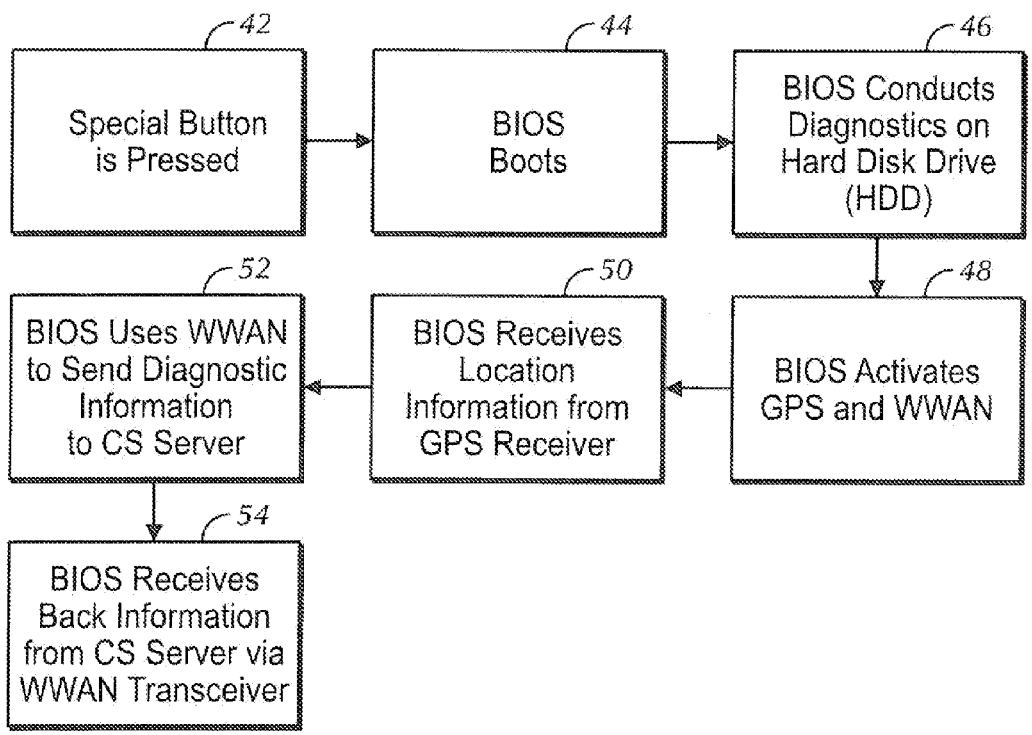
FIG. 3 is a flow chart presenting logic after the special button is pressed.

Moving in reference to FIG. 3, a flow chart describes the sequence of events set into motion upon activation of the hardwired special button 28 or its software form 40. The special button is pressed at block 42 and BIOS immediately boots at block 44 and begins a series of tasks requiring no further user interaction. BIOS conducts diagnostics on the HDD 14 at block 46. The WWAN transceiver 18 and GPS receiver 20 are activated by BIOS and BIOS receives the location information from the GPS 20 at blocks 48 and 50, respectively.

Once all information is ascertained, BIOS sends it to the customer service server 32 at block 52 via WWAN transceiver 18 to an address preset in the PC 10 and accessible to BIOS. Information sent includes diagnostic information concerning the HDD 14 and at least one identifier of the PC 10, including a HDD serial number and model and location information from the GPS 20, as well model and/or serial number of the PC 10. The WWAN communication link may be, without limitation, a direct connection to the service server 32 through the Internet, or through a phone call, or over a local area network (LAN) and thence the Internet, or using a modem-based phone call.

Lastly, at block 54 BIOS receives back information from the customer service server 32 via the WWAN transceiver 14. Information returned by the customer service server 32 may be an address of a local service center or computer recovery advice for the HDD that a service center generates from information sent to it by the user computer 10. Thus, the service server 32 can send a short message to the user for presentation on the display 24 informing the user how to get his PC fixed.

In other embodiments, upon selection of the special key or button, a user interface (UI) may be presented on the display 24 giving a user selectable options of contacting a technician, contacting a friend on a social network, or execute the logic discussed above. Also, the user may select to transmit a request for help multiple on multiple social networking sites asking for technical support assistance. Or, sends a message or software package can be sent by the service server 32 to the computer to order the computer to boot to a state where further diagnostics can be run, using, e.g., random access memory (RAM) as a temporary storage location for the diagnostic tool. Yet another option can be that the service server 32 sends a message or software package to the computer which allows the computer to boot to a limited version of a main operating system, again using RAM as a temporary storage location for the OS.

In the case in which the user pushes the special button while the main operating system is not active and the HDD is failing, a signal automatically can be sent as described above.

While the particular RECOVERY FROM HDD FAILURE AND TECHNICAL SUPPORT THROUGH WWAN is herein shown and described in detail, it is to be understood that the subject matter which is encompassed by the present invention is limited only by the claims.

What is claimed is:

1. Computer comprising:
   processor;
   solid state memory accessible to the processor for executing a basic input output system (BIOS);
   hard disk drive (HDD) storing a main O.S. configured to be booted into the memory by BIOS during a power on operation;
   wireless wide area network (WWAN) transceiver communicating with the processor;
   special key communicating a signal to the processor when manipulated by a user, the signal causing the processor to automatically execute at least one diagnostic routine to ascertain status of the HDD and to activate the WWAN transceiver to send information to a predetermined address associated with a service computer using the WWAN transceiver, the information including at least status of the HDD and an identifier associated with the computer.

2. The computer of claim 1, further comprising a global positioning satellite (GPS) receiver activated by BIOS to communicate location information of the computer to a PC.

3. The computer of claim 2, wherein the information sent to the service computer includes the location information of the computer.

4. The computer of claim 1, wherein the information sent to the service computer includes a model number of the computer.

5. The computer of claim 1, wherein the information sent to the service computer includes a serial number of the computer.

6. The computer of claim 1, wherein the special key is a hardware key.

7. The computer of claim 1, wherein the special key is a software key.

8. The computer of claim 1, wherein BIOS activates the WWAN transceiver and sends the information to the service computer without being able to boot the main O.S. from the HDD into memory.

9. Method comprising:
   at a user computer, receiving a signal from a special key prior to booting a main operating system (O.S.) from a hard disk drive (HDD) of the user computer into a solid state memory of the user computer;
   responsive to the signal from the special key and without further user interaction, executing at least one diagnostic test on the HDD;
   further responsive to the signal from the special key and without further user interaction, activating a wireless wide area network (WWAN) transceiver associated with the user computer; and
   further responsive to the signal from the special key and without further user interaction, using the WWAN transceiver to automatically send to a service computer at least one result of the diagnostic test and at least one identifier associated with the computer.

10. The method of claim 9, comprising prestoring an address of the service computer in the memory to be accessible to a basic input output system (BIOS).

11. The method of claim 9, further responsive to the signal from the special key and without further user interaction, using the WWAN transceiver to automatically send to the service computer a geographic location of the user computer.

12. The method of claim 11, further comprising receiving back from the service computer at the user computer a location of a service center.

13. The method of claim 9, wherein the identifier includes a model number of the computer.

14. The method of claim 9, wherein the identifier includes a serial number of the computer.

15. The method of claim 9, wherein the special key is a hardware key.

16. The method of claim 9, wherein the special key is a software key.

17. The method of claim 9, comprising executing the diagnostic test on the HDD, activating the WWAN transceiver, and automatically sending to the service computer the result of the diagnostic test and identifier associated with the computer without being able to boot the main O.S. from the HDD into memory.

18. User computer comprising:
 a hard disk drive (HDD);
 a special key manipulable by a user to cause a basic input output system (BIOS) to automatically gather location information about the user computer from a position receiver and gather information about the HDD, activate a wireless wide area network (WWAN) transceiver, and automatically send the location information and information about the HDD over the WWAN to a service computer, the user computer receiving back from the service computer a location of a nearest service center to the user computer.

19. The user computer of claim 18, wherein the user computer also receives back from the service computer recovery advice for the HDD that a service center generates from information sent to it by the user computer.

20. The user computer of claim 18, wherein an address of the service computer is prestored in memory of the user computer.

* * * * *